(12) United States Patent
Kohli

(10) Patent No.: US 11,770,499 B2
(45) Date of Patent: Sep. 26, 2023

(54) ALIGNING VIDEO CONFERENCE PARTICIPANT WINDOWS

(71) Applicant: JPMorgan Chase Bank, N.A., New York, NY (US)

(72) Inventor: Vikas Kohli, Robbinsville, NJ (US)

(73) Assignee: JPMorgan Chase, N.A., New York, NY (US)

( * ) Notice: Subject to any disclaimer, the term of this patent is extended or adjusted under 35 U.S.C. 154(b) by 27 days.

(21) Appl. No.: 17/470,761

(22) Filed: Sep. 9, 2021

(65) Prior Publication Data

US 2023/0072914 A1    Mar. 9, 2023

(51) Int. Cl.
*H04N 7/15* (2006.01)
*H04L 12/18* (2006.01)
*H04L 65/1069* (2022.01)
*H04L 65/1083* (2022.01)

(52) U.S. Cl.
CPC .......... *H04N 7/15* (2013.01); *H04L 12/1813* (2013.01); *H04L 65/1069* (2013.01); *H04L 65/1083* (2013.01)

(58) Field of Classification Search
CPC ............ H04N 7/15; H04L 29/06; H04L 12/18
USPC .............................................. 348/14.01–14.16
See application file for complete search history.

(56) References Cited

U.S. PATENT DOCUMENTS

| 6,208,373 | B1 * | 3/2001 | Fong ...................... H04N 7/144 |
| | | | 348/14.03 |
| 9,307,001 | B2 * | 4/2016 | Chougle ............. H04L 65/1083 |
| 10,893,231 | B1 * | 1/2021 | Huffman ................ H04N 7/144 |
| 2012/0274736 | A1 * | 11/2012 | Robinson ............ H04L 65/1083 |
| | | | 348/E7.083 |
| 2020/0314299 | A1 * | 10/2020 | Okuley .................. H04N 7/144 |
| 2021/0051245 | A1 * | 2/2021 | Yu .......................... H04N 23/57 |

* cited by examiner

*Primary Examiner* — Melur Ramakrishnaiah

(57) ABSTRACT

In one example, a video conferencing method to align video conference participant windows is disclosed. The method determines a position of a camera that captures images of a video conference participant. The method determines which one of multiple participant windows is a speaker participant window and aligns the speaker participant window with the position of the camera. The method may capture user-input parameters of an area adjacent to the camera to position the speaker participant window.

14 Claims, 7 Drawing Sheets

ALIGNING VIDEO CONFERENCE PARTICIPANT WINDOWS

BACKGROUND

A video conferencing system can transmit/receive audiovisual signals so that participants at different locations can communicate with each other. Participants may communicate and collaborate with each other both within and/or outside an organization.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

DETAILED DESCRIPTION

As noted above, video conferencing systems are used to facilitate communication between two or more users at different locations. Video conferencing systems may include peripherals such as a video display device, laptop, desktop monitor, or a television screen. Other peripherals may include a microphone, speaker and a camera/lens/web cam.

A camera that captures images of a user may be integrated with or placed around the periphery of a monitor or computer display screen. The computer display screen receives the video signals from the camera to display captured images of the user. When multiple participants are involved, each participant utilizes a camera, and each participant's image is displayed in a corresponding one of multiple window screens, into which the computer display screen has been partitioned.

The location of the camera around the periphery of the computer display screen often varies (this depends upon user preference or the computer system configuration). Likewise, the location of the window screen that displays a speaking participant may also vary. As such, the camera location and that of the speaking participant window may be different.

Thus, when a non-speaker participant or user is paying attention (as appropriate) to a speaking participant, the user's eyes naturally focus on the speaking participant window screen. The user cannot contemporaneously view the camera that is positioned on a different area of the display screen.

This inability to maintain digital eye contact with the camera conveys an incorrect perception that the user is looking away from the speaker during conversation. As a result, the video conferencing experience for many participants can be poor and often is less engaging. A number of use cases in which this situation occurs will now be described with reference to FIGS. 1A-1D.

Figure 1A:
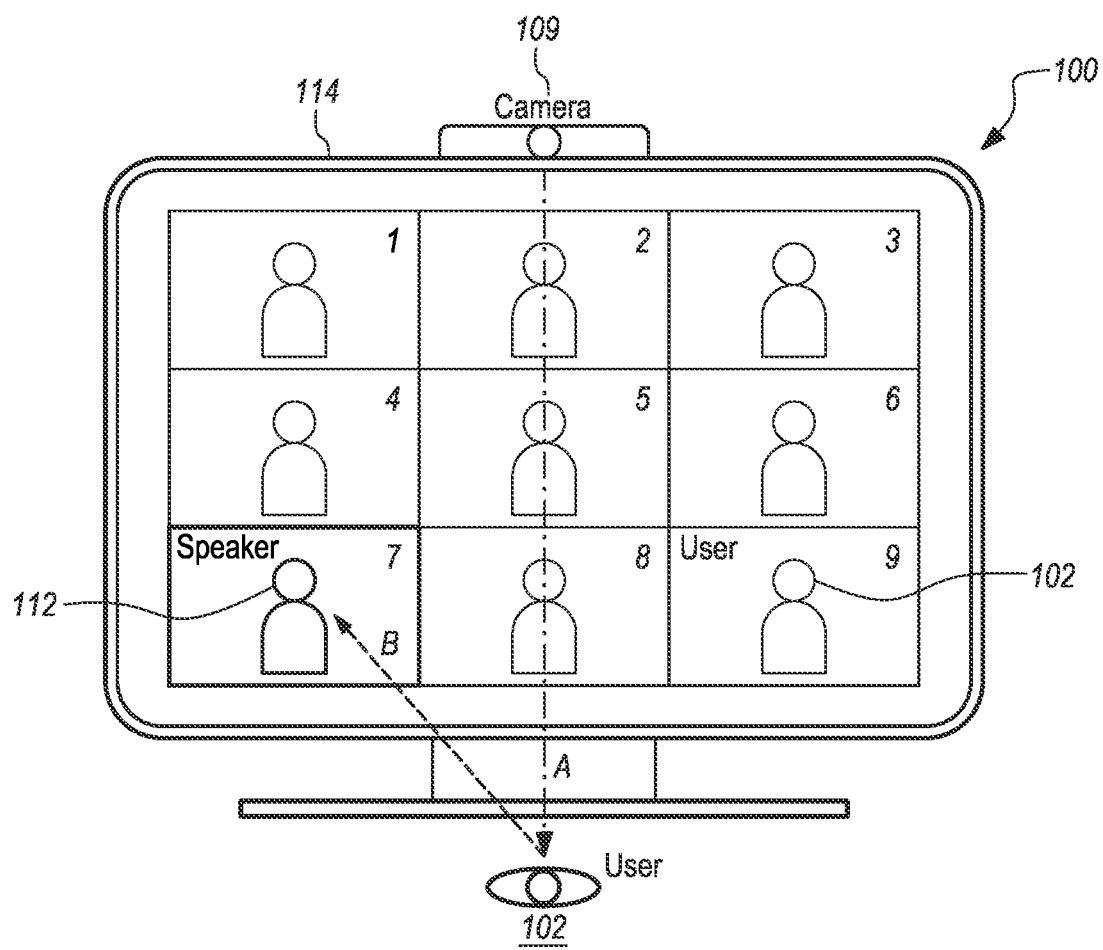
FIG. 1A illustrates a computer display screen as viewed during an example video conference.

FIG. 1A illustrates a computer display screen 100 as viewed during an example video conference. In this example, the video conferencing experience is poor due to an inability to maintain digital eye contact between a speaker participant 112 and a non-speaker participant/user 102 (depicted as an eye in FIG. 1A). A speaker participant is any user that is participating in a video conference and is presenting or speaking for any designated period of time.

As shown in FIG. 1A, the speaker participant 112 is displayed in a window 7 on the lower left corner of the computer display screen 100. Computer display screen 100 is partitioned into nine grids or windows 1 through 9 to display images of all participants.

In this example, during the video conference, a user or non-speaker participant 102 is positioned in front of the computer display screen 100 of a computer device (not shown). A non-speaker participant is any user that is participating in a video conference and is listening (e.g., to a webinar or meeting) and not presenting or speaking for any designated period of time. As shown in FIG. 1A, a camera 109 that is positioned approximately midway of the top periphery 114 of the computer display screen 100 is used to capture an image of the user 102 for display in a corresponding window 9.

As the speaker participant 112 is talking, user 102 is viewing the speaker participant 112. This line of view is indicated by arrow B. However, camera 109 is capturing the image of user 102 via another line of view shown as arrow A. Because user 102 is not looking directly at the camera 109 but is rather paying attention to the speaker participant 112, it appears to the speaker participant 112 that user 102 is not fully engaged.

As a result, the video conferencing experience is poor due to the inability to maintain digital eye contact between the speaker participant 112 and user 102. Such an experience does not replicate a person-to-person experience where eye contact is maintained during conversation.

Figure 1B:
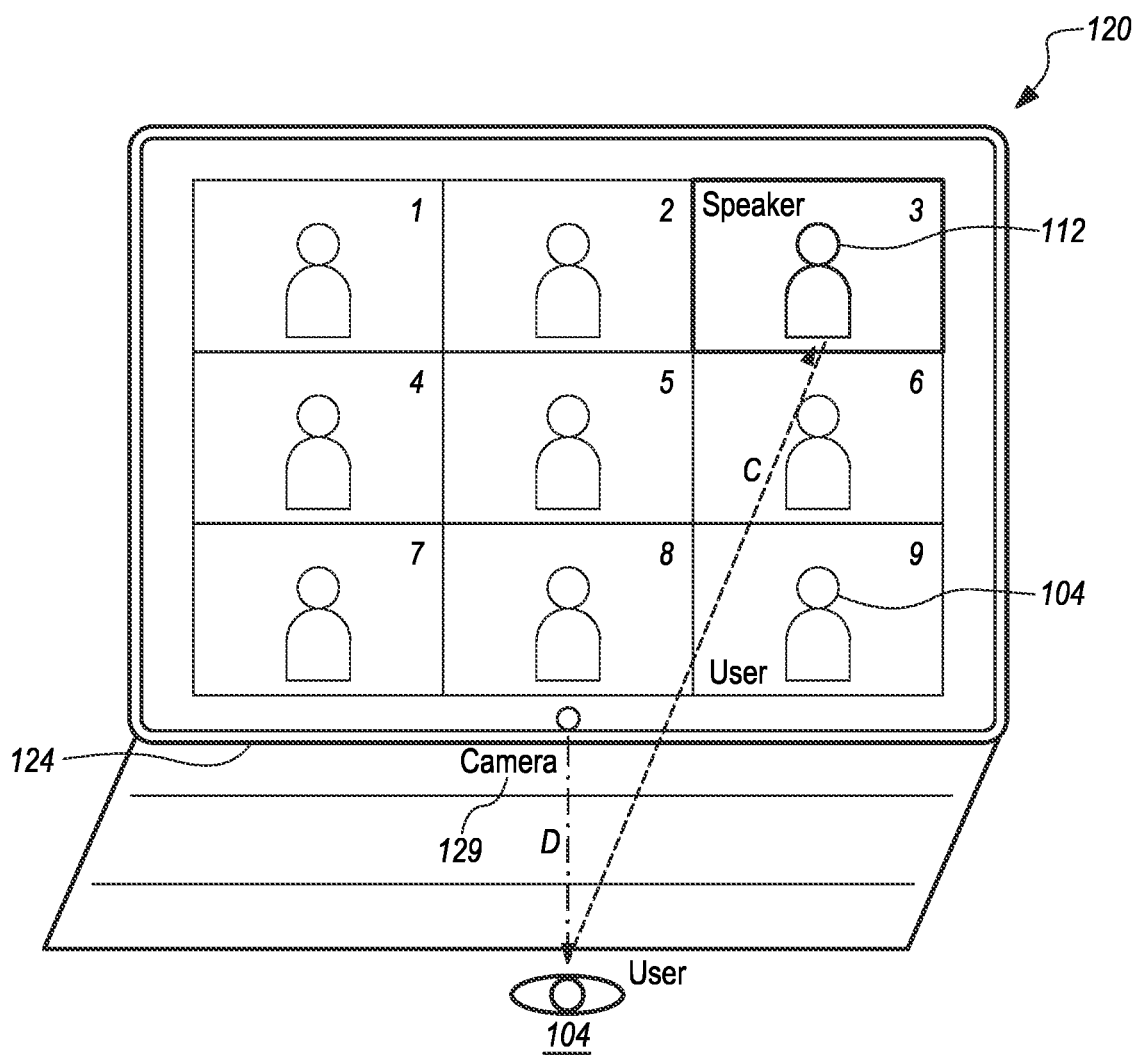
FIG. 1B is another example of a computer display screen to illustrate an inability to make digital eye contact during a video conference.

FIG. 1B is another example of a computer display screen 120 to illustrate an inability to make digital eye contact during a video conference. In this example, unlike FIG. 1A in which the camera is positioned on top of the computer display screen, here, a camera 129 is positioned on a bottom periphery 124 of the computer display window 120. Camera 129 is positioned to capture an image of a user 104 (illustrated as an eye) for display in a corresponding window 9.

Here, the speaker participant 112 is displayed in window 3 at the upper right corner of the computer display screen 120. As the speaker participant 112 is talking, user 104 is directly viewing the speaker participant 112 via line of view C.

However, camera 129 is capturing the image of user 104 via a direct line of sight shown as arrow D. Since user 104 is paying attention to speaker participant 112 and not to the camera 129, it appears to the speaker participant 112 that user 104 is not fully engaged. As a result, as in the use case described in FIG. 1A, the video conferencing experience is poor due to an inability to maintain digital eye contact between the speaker participant 112 and non-speaker participant/user 104.

Figure 1C:
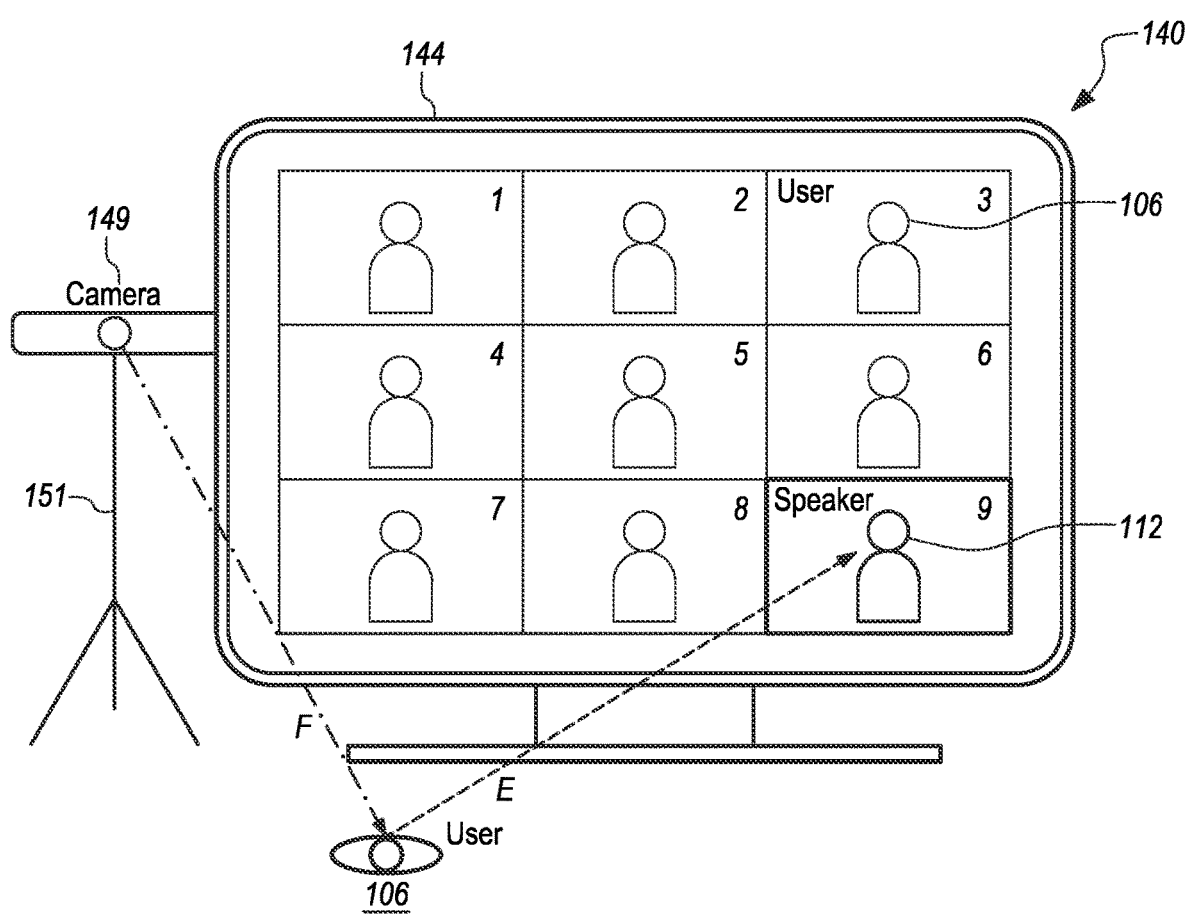
FIG. 1C is an example of the computer display screen to illustrate an inability to make digital eye contact during a video conference.

FIG. 1C is another example of the computer display screen 140 to illustrate an inability to make digital eye contact during a video conference. In this example, a camera 149 is on a stand 151 and is positioned adjacent to a side periphery 144 of the computer display window 140. Camera 149 is positioned to capture an image of a user 106 (illustrated as an eye) for display in a corresponding participant window 3.

Here, the speaker participant 112 is displayed in a window 9 at the lower right corner of the computer display screen 140. As the speaker participant 112 is talking, user 106 is directly viewing the speaker participant 112 via line of view E. However, camera 149 is capturing the image of user 106 via a direct line of sight shown as F.

Since user 106 is paying attention to speaker participant 112 (window 9) and not to the camera 149, it appears to the speaker participant 112 that user 106 is not fully engaged. As a result, as in the use case described in FIGS. 1A and 1B, the video conferencing experience is poor due to an inability to maintain digital eye contact between the speaker participant 112 and user 106.

Figure 1D:
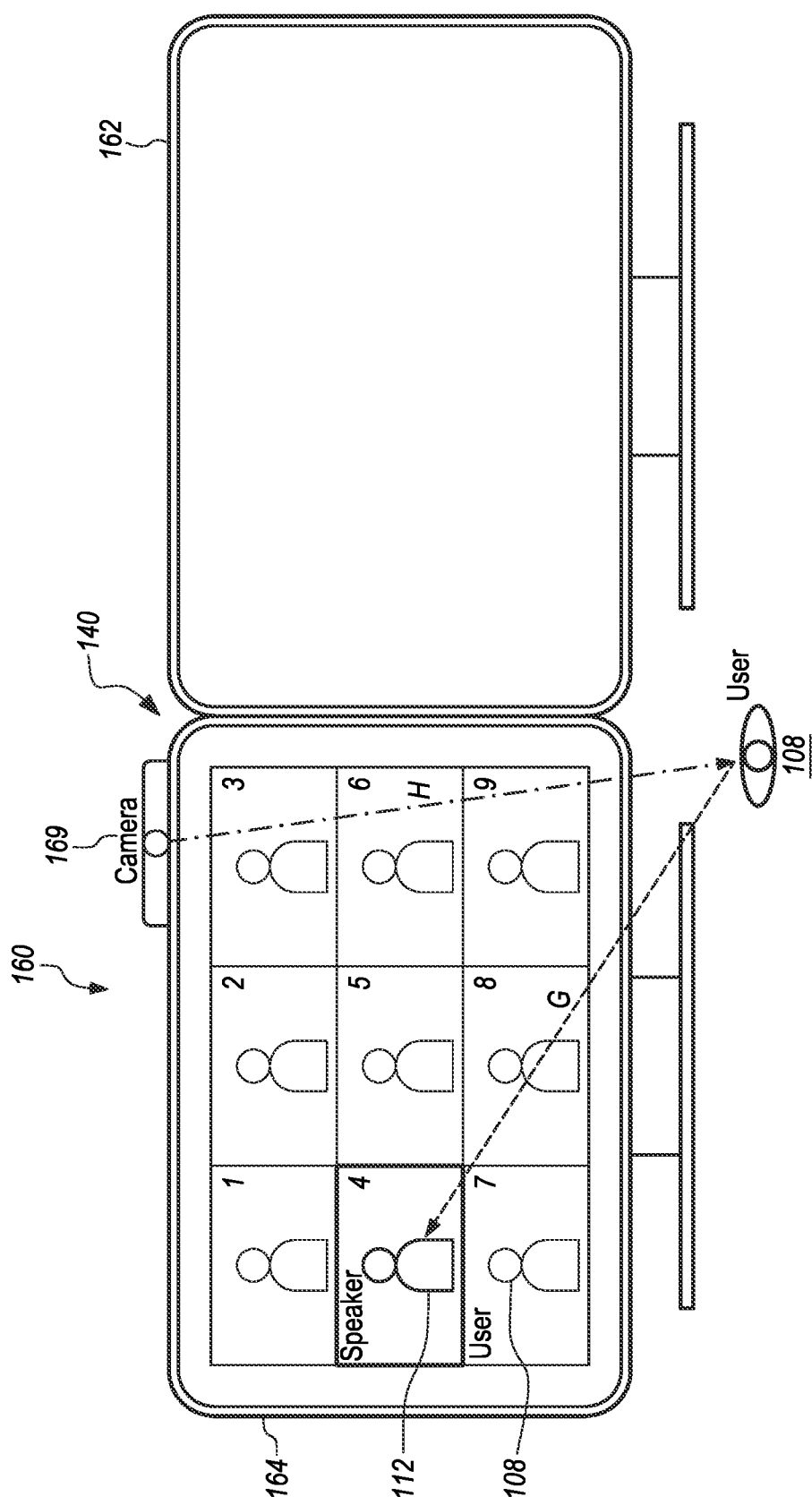
FIG. 1D is a further example of the computer display screen to illustrate an inability to make digital eye contact during a video conference.

FIG. 1D is a further example of the computer display screen 160 to illustrate an inability to make digital eye contact during a video conference. Unlike FIGS. 1A-1C in which a single computer display screen is used, FIG. 1D employs a second computer display screen 162 adjacent to the computer display screen 160. As such, a camera 169 is located at midpoint 171 of the top periphery of both of the computer display screens 160 and 162, and so that camera 169 is in front of a user 108.

Here, the speaker participant 112 is displayed in a window 4 at the left periphery 164 of the computer display screen 160. As the speaker participant 112 is speaking, user 108 is directly viewing the speaker participant 112 via line of view G. However, camera 169 is capturing the image of user 108 via a direct line of sight shown as arrow H. Because user 108 is paying attention to speaker participant 112 and not to the camera 169, it appears to the speaker participant 112 that user 108 is not fully engaged. As a result, as in the use cases described above, the video conferencing experience is poor due to an inability to maintain digital eye contact between the speaker participant 112 and user 108.

The present disclosure addresses the foregoing by providing a video conferencing method that aligns video conference participant windows. For some examples, the method begins operation by determining a position of a camera for capturing video conference participants. The method may then determine which one of multiple conference participant windows is a speaker participant window and align the speaker participant window with the camera position.

In this manner, a video conference participant can appear to contemporaneously view the camera while paying attention and viewing the speaker participant window. In other words, video conference participants can almost maintain congruency between the line of sight extending from the camera to the video conference participant and the line of sight from the video conference participant to the speaker participant window. Digital eye contact can be maintained without conveying an incorrect perception that the video conference participant is inattentive.

For some examples of the present disclosure, the method may capture user input parameters of the area adjacent to the camera and dynamically lock the speaker participant window in that area. For some examples, the method may align multiple participant windows in the adjacent area where the multiple participant windows may be selected based on hierarchy. In this manner, a lower level employee can aggregate speakers that are higher level employees into multiple participant windows.

Figure 2:
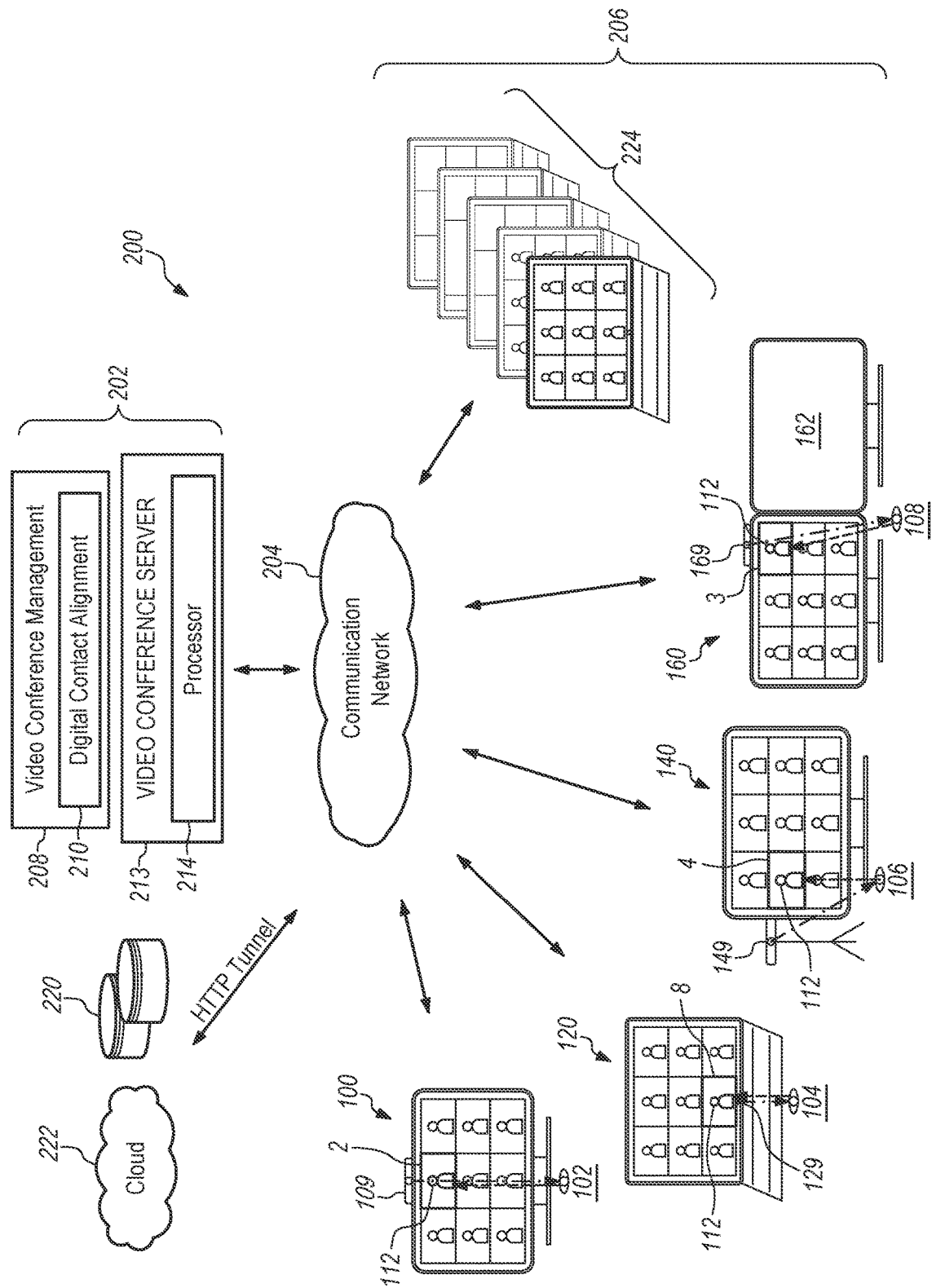
FIG. 2 illustrates a video conferencing system to facilitate participant digital alignment according to an example of the present disclosure.

FIG. 2 illustrates a video conferencing system 200 to facilitate participant digital alignment according to an example of the present disclosure. In FIG. 2, video conferencing system 200 includes a video conference alignment system 202 communicably coupled to a plurality of video conference participants 206 via a communication network 204. Communication network 204 may be any communication system that allows point-to-point communication between two or more end points of all data types including audio, video, etc., and any associated metadata.

Here, although video conference alignment system 202 is shown on a server side, this system may be incorporated on the client side, or it may be a hybrid client/server model. As shown in FIG. 2, video conference alignment system 202 may include a video conference server 213 and a video conference management module 208. A module may be a program, software and/or hardware (usually self-contained) that can execute one or more tasks.

The video conference server 213 in conjunction with the video conference management module 208 may host a website which may be accessed upon proper authentication by the video (and audio) conference participants 206. Video conference server 213 and video conference management module 208 may also service API (application programming interface) requests.

More specifically, video conference server 213 may host meetings, webinars, etc. and can orchestrate the distribution of video and voice content between video conference participants 206 for a video conference session. Distribution of content may be based on one or more transport protocols usually determined by the need to have more robust and reliable communications and by connecting to a specified port.

As an example, content may be distributed via UDP (user datagram protocol). As another example, TCP (transmission control protocol) may be utilized. Further, another example of a transport protocol may be RTP (real-time transport protocol).

In FIG. 2, as shown, video conference management module may include a digital contact alignment module 210 to determine a position of a camera to capture images of video conference participants 206 viewing a camera during a video conference. Digital contact alignment module 210 may then determine which one of multiple participant display windows is a speaker participant window.

Digital content alignment module 210 then aligns the speaker participant window with the position of the camera as will be further described below. For some examples, digital content alignment module 210 may include instruction sets and subroutines for the video conferencing, which may be stored on storage device (e.g. 220 of FIG. 2) coupled to a computing device, which may be executed by one or more processors and one or more memory architectures included within the computing device.

As shown in FIG. 2, the video conferencing system 200 further includes video conference participants 206 that collectively include the video conference participants described with reference to FIGS. 1A-1D. Specifically, in FIG. 2, video conference participants 206 include non-speaker participant/user 102 viewing computer display screen 100 (of FIG. 1A), non-speaker participant/user 104 and computer display screen 120 (of FIG. 1B), non-speaker participant/user 106 (of FIG. 1C) and non-speaker participant/user 108 of (FIG. 1D).

Video conference participants 206 may also include five additional participants (not shown) but collectively represented by computer display screens 224. The additional five participants fill up the remaining grids of the computer display screens. However, for the sake of brevity, the five additional participants and computer display screens 224 will not be further described.

Although not shown, the computer devices used by each non-speaker participant 102, 104, 106, 108 may execute an appropriate operating system. For example, the computer device for non-speaker participant 102 may be a desktop with a Windows, Mac or Linux operating system. In another example, the computer may be a mobile device with an Android or IoS platform. For some examples, the computer may include a web browser, a web browser plug-in or applet employing WebRTC protocol.

In operation, a video conference participant wishing to participate in a given video conference begins by sending a request to video conference server 213. Video conference server 213 responds via an HTTP (hypertext transfer protocol) connection to deliver metadata including the video conference meeting details that are needed by the requesting computer to join the session.

The video conference participant then uses the information to establish a session connection with video conference server 213. For example, the connection may be established via UDP (user datagram protocol) for a specific port. In another example, if the connection to video conference server 213 is unsuccessful, the video conference participants may establish a video conference session via an HTTP tunnel to one or more servers located in cloud 222.

Each of the video conference participants may then configure audio and video data into IP (Internet protocol) data into packets, with each IP data packet having a 'header' that identifies its content and destination. Video conference server 213 receives all of the data packets from each of the video participants and simultaneously transmits the packets to the relevant participant to host the video conference session.

During the video conference, all of the nine (for example) video conference participants 206, including the speaker participant 112, are displayed on window grids on each computer display screen 100, 120, 140, 160 as shown in FIG. 2. Unlike FIGS. 1A-1D that show digital-eye-contact misalignment between the speaker participant 112 and video conference participants 102, 104, 106, 108, the example of FIG. 2 maintains digital eye contact between speaker participant 112 and the non-speaker participants 102, 104, 106, 108.

For example, on computer display screen 100 (FIG. 2), window 2 which displays speaker participant 112 is now adjacent to and below camera 109. Therefore, user 102 can directly observe speaker participant 112 and also appear to be looking at camera 109. In other words, the line of sight between user 102 and window 2/speaker participant 112 and the line of sight between user 102 and camera 109 are almost congruent.

The speaker participant 112 now perceives user 102 as looking directly at him/her. This perception promotes both user and speaker engagement as well as creating a symbiotic relationship between non-speaker participants and the speaker participant. The more the speaker feels engagement from the other participants, the more the energy that is used to deliver the speaker's presentation.

The same goes for computer display screens 120, 140 and 160 of FIG. 2. On computer display screen 120, speaker participant 112 is now displayed at window 8 which is aligned with camera 129. Thus, the line of sight between user 104 and window 8/speaker participant 112 and the line of sight between user 104 and camera 129 are almost congruent. The speaker participant 112 now perceives user 104 as looking directly at him/her to increase conference participant engagement.

And for computer display screen 140, speaker participant 112 is displayed at window 4, which is aligned with camera 149. Thus, the line of sight between user 106 and window 4/speaker participant 112 and the line of sight between user 106 and camera 149 are almost aligned. The speaker participant 112 now perceives user 106 as looking directly at him/her to increase participant digital eye contact.

In FIG. 2, the same can be said for computer display screen 160. Speaker participant 112 is now at window 3 and aligned with camera 169. Thus, the line of sight between user 108 and speaker participant 112 in window 3 and the line of sight between user 108 and camera 169 are almost congruent. The speaker participant 112 now perceives user 106 is looking directly at him/her to increase conference participant engagement and satisfaction.

Figure 3:
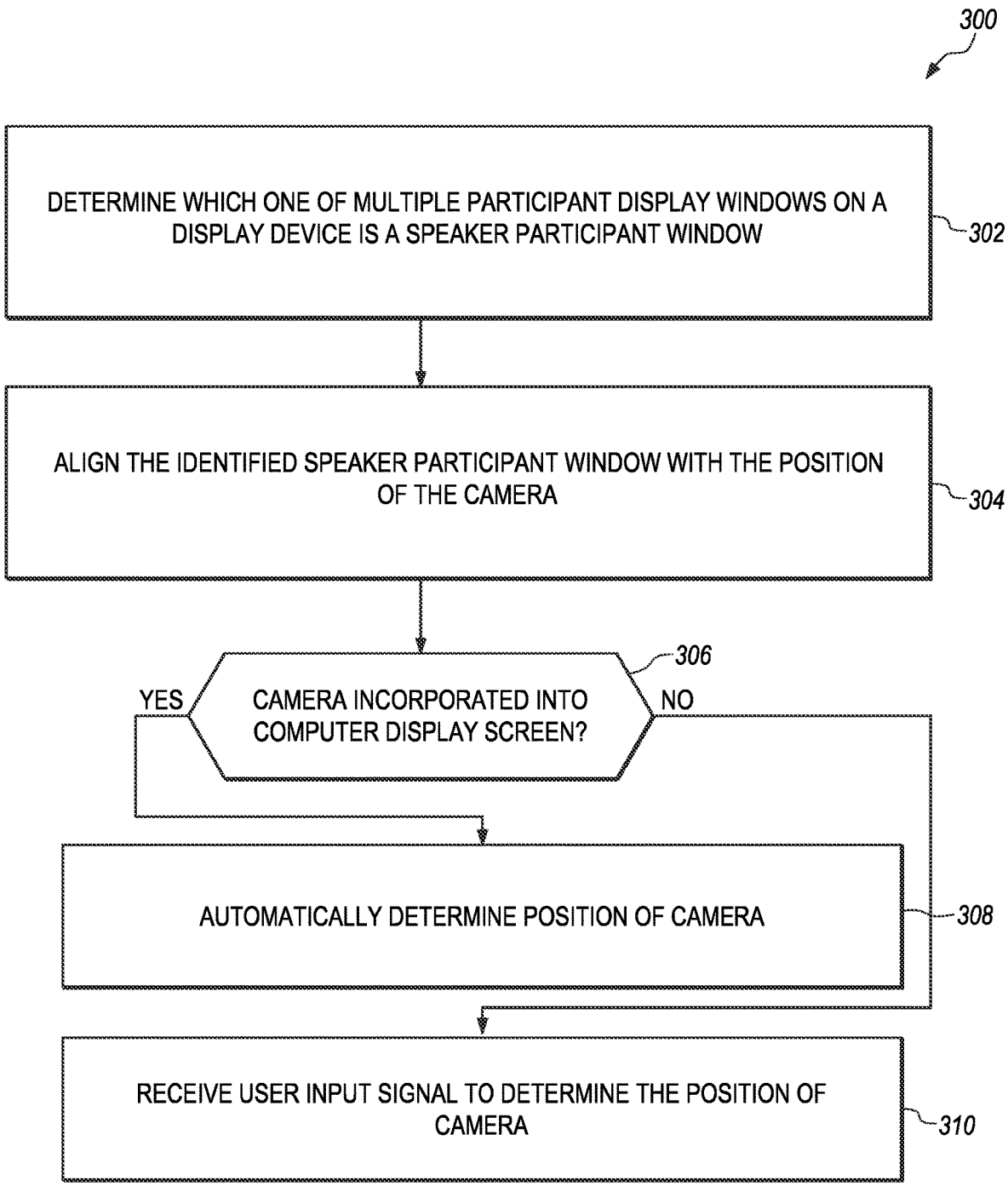
FIG. 3 illustrates a video conference method to promote digital eye contact alignment between conference participants and speaker participants according to examples of the present disclosure.

FIG. 3 illustrates a video conference method 300 to promote digital eye contact alignment between non-speaker conference participants 102, 104, 106, 108 and speaker participant 112 according to examples of the present disclosure. (Note that conference participants 224 of FIG. 2 are not discussed for the sake of brevity).

At block 302, video conference method 300 begins operation by determining which one of the participant display windows 1, 2, 3, 4, 5, 6, 7, 8, 9 (of FIG. 2) on computer display screens 100, 120, 140 and 160 is a speaker participant window that is displaying speaker participant 112. In one example, digital contact alignment module 210 may provide software instructions to a browser (for example) executed on the computer systems of non-speaker user participants 102, 104, 106, 108. For some examples, the software instructions may identify IP packets and associated IP addresses for the current audio feed to determine which participant display window is associated with speaker participant 112. Thus, for computer display screen 100 of FIG. 1A, window 7 may be identified as the speaker participant 112 window.

At Block 304, for some examples, video conference method 300 then aligns the identified speaker participant 112 window with the position of the camera, i.e., video conference 300 may dynamically lock the speaker window with the position of the camera.

In an example, the video conference method may align multiple participant windows in the adjacent area where the multiple participant windows may be selected based on hierarchy. As an example, a video conference participant may desire to aggregate high level executives of a company in the area adjacent to the camera. The high-level executives may be potential speakers. The higher the title, the closer the executive is to the camera position. As an example, a C-suite executive is positioned closer to the camera relative to a supervisor of the company.

In FIG. 3, block 304 is itself comprised of a number of sub-operations or subroutines namely blocks 306, 308, 310.

At decision block 306, video conference method 300 determines whether cameras 109, 129, 149, 169 are respectively incorporated into the computer display screens 100, 120, 140, 160.

At block 308, if cameras 109, 129, 149, 169 are respectively incorporated into the computer display screens 100, 120, 140, 160, digital contact alignment module 210 automatically determines the position of each respective camera. In one example, a database of desktop systems, laptop systems, etc. may be created to store model information and the camera position for each model. For example, the information may be stored on the server side by database 220.

At block 310, if cameras 109, 129, 149, and 169 are respectively incorporated into the computer display screens 100, 120, 140, and 160, digital contact alignment module 210 receives a user input signal to determine the camera position. In one example, a user input indicating the camera position is stored ahead of time during setup. For some examples, the user may be asked for the camera position once the video conference system is executed at startup. Once the camera position is detected, the identified speaker participant window is aligned with the camera position.

Figure 4:
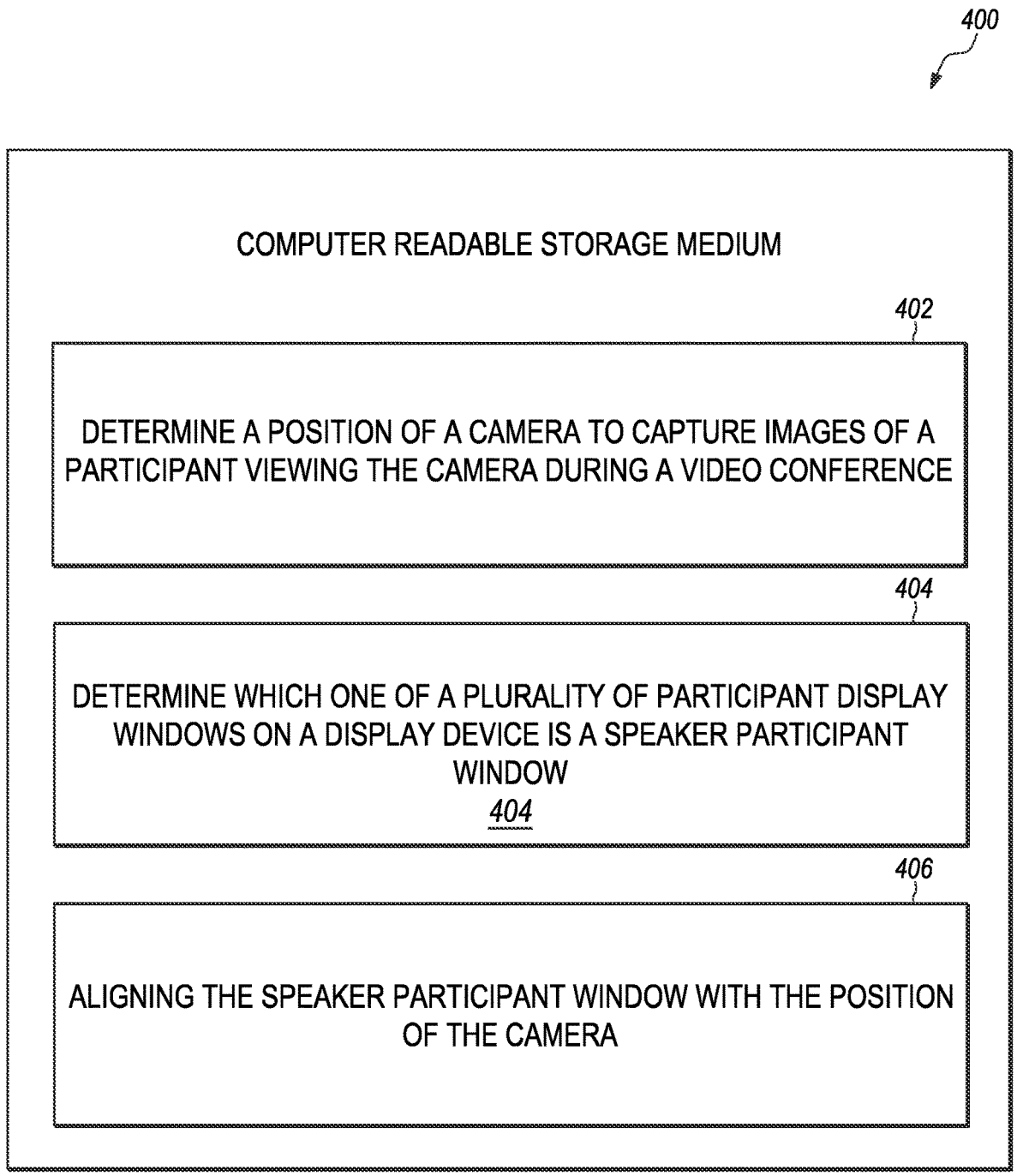
FIG. 4 illustrates example instructions stored on an example non-transitory computer-readable storage medium to implement video conferencing to align video conference participant windows according to examples of the present disclosure.

FIG. 4 illustrates example instructions stored on an example non-transitory computer-readable storage medium to implement video conferencing to align video conference participant windows according to examples of the present disclosure.

As shown in FIG. 4, the non-transitory computer-readable storage medium 400 includes instruction 402 that may cause a processor to perform the operation of determining a position of a camera to capture images of a participant viewing the camera during a video conference.

Instruction 404 may cause a processor to perform the operation of determining which one of a plurality of participant display windows on a display device is a speaker participant window.

Instruction 406 may cause a processor to perform the operation of aligning the speaker participant window with the position of the camera. For some examples, the aligned speaker participant window may be adjacent to the position of the camera. For some examples, the instructions may cause a processor to perform the operation of capturing user-input parameters of an area to position the speaker participant window on a screen for displaying the participant windows; and positioning and locking the speaker window in the area The non-transitory computer-readable storage medium 400 may be any electronic, magnetic, optical, or other physical storage device that stores executable instructions. For example, the non-transitory computer-readable storage medium 400 may be a random access memory (RAM), an electrically-erasable programmable read-only memory (EEPROM), a storage drive, an optical disc, or the like. The non-transitory computer-readable storage medium 400 can be encoded to store executable instructions that cause a processor to perform operations according to examples of the disclosure.

The present disclosure may employ a software stack to enlist the underlying tools, frameworks, and libraries used to build and run example applications of the present disclosure. Such a software stack may include PHP, React, Cassandra, Hadoop, Swift, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, AngularJS, and Node.js) stack may be employed. In another example, a LAMP (Linux, Apache, MySQL, and PHP) stack may be utilized.

Any suitable programming language can be used to implement the routines of particular examples including Java, Python, JavaScript, C, C++, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure which is defined by the appended claims along with their full scope of equivalents.

I claim:

1. A video conferencing method to align video conference participant windows, the method comprising:
   determining a position of a camera to capture images of a participant viewing the camera during a video conference;
   determining which one of a plurality of participant display windows on the display device is a speaker participant window; and
   aligning the speaker participant window with the position of the camera by displaying the speaker participant window adjacent to the camera, wherein the speaker participant window is closest to the camera relative to other participant display windows.

2. The method of claim 1 wherein aligning the speaker participant window is to maintain digital eye contact between a participant and a speaker displayed in the speaker participant window.

3. The method of claim 1 further comprising dynamically locking the speaker participant window with the position of the camera.

4. The method of claim 1 further comprising:
   capturing user-Input parameters of an area to position the speaker participant window on a screen for displaying the participant windows; and
   positioning and locking the speaker window in the area.

5. A video conferencing method to align video conference participant windows, the method comprising:
   determining a position of a camera to capture images of a participant viewing the camera during a video conference, wherein the position of the camera is determined by using a database of computer desktop and camera models;
   determining which one of a plurality of participant display windows on the display device is a speaker participant window; and aligning the speaker participant window with the position of the camera.

6. The method of claim 1 further comprising aligning multiple speaker windows with the camera.

7. A method to align a video conferencing participant window, the method comprising:
- capturing user-input parameters of an area of a display screen adjacent to a camera to locate a speaker window during a video conference;
- determining which one of a plurality of participant windows in the video conference is a speaker participant window;
- dynamically locking the speaker participant window in the area adjacent to the camera.

8. The method of claim 7 further comprising aligning multiple participant windows in the area adjacent to the camera.

9. The method of claim 8 further wherein the aligned multiple participant windows are selected based on a title hierarchy.

10. A non-transitory, computer-readable storage medium having stored thereon instructions which when executed by a processor, cause the processor to perform operations to align video conference participant windows, the operations comprising:
- displaying a plurality of participant windows including a speaker participant window on a display device during a video conference;
- determining a position of a camera to align the speaker participant window during the video conference; and
- transitioning the speaker participant window from a first location to an area adjacent to the camera position to maintain digital eye contact.

11. The non-transitory, computer-readable storage medium of claim 10 wherein the first location is an area of a display screen without digital eye contact.

12. The non-transitory, computer-readable storage medium of claim 10 further comprising aligning multiple participant windows in the area adjacent to the camera.

13. The non-transitory, computer-readable storage medium of claim 10 wherein the area adjacent to the camera is determined based on user-input parameters.

14. The non-transitory, computer-readable storage medium of claim 10 further comprising dynamically locking the speaker window in the area adjacent to the camera.

* * * * *